United States Patent
Sakata

(10) Patent No.: US 11,148,052 B2
(45) Date of Patent: Oct. 19, 2021

(54) VIDEO GAME PROGRAM AND SYSTEM FOR GENERATING A STACK WHEN OBJECT PASSES THROUGH A PERIPHERAL AREA

(71) Applicant: SQUARE ENIX CO., LTD., Tokyo (JP)

(72) Inventor: Shinpei Sakata, Tokyo (JP)

(73) Assignee: SQUARE ENIX CO., LTD., Tokyo (JP)

(*) Notice: Subject to any disclaimer, the term of this patent is extended or adjusted under 35 U.S.C. 154(b) by 0 days.

(21) Appl. No.: 16/648,036

(22) PCT Filed: Sep. 20, 2017

(86) PCT No.: PCT/JP2017/033986
§ 371 (c)(1),
(2) Date: Mar. 17, 2020

(87) PCT Pub. No.: WO2019/058468
PCT Pub. Date: Mar. 28, 2019

(65) Prior Publication Data
US 2020/0238172 A1    Jul. 30, 2020

(51) Int. Cl.
*A63F 13/35* (2014.01)
(52) U.S. Cl.
CPC ................................. *A63F 13/35* (2014.09)
(58) Field of Classification Search
None
See application file for complete search history.

(56) References Cited

U.S. PATENT DOCUMENTS 6,251,011 B1    6/2001  Yamazaki
6,589,120 B1    7/2003  Takahashi
(Continued)

FOREIGN PATENT DOCUMENTS

JP    10-230081    9/1998
JP    2001-113047  4/2001
(Continued)

OTHER PUBLICATIONS

International Search Report (ISR) from International Searching Authority (Japan Patent Office) in International Pat. Appl. No. PCT/JP2017/033986, dated Nov. 28, 2017.

*Primary Examiner* — Ronald Laneau
(74) *Attorney, Agent, or Firm* — Greenblum & Bernstein, P.L.C.

(57) ABSTRACT

A peripheral area is provided on the periphery of an operation target (for example, a player character) of a user. When an object (for example, a bullet) is located on the periphery of the operation target (for example, passes therethrough), an effect different from that when the object touches the operation target (for example, hits it) is generated. A form of the peripheral area may be changed. In a case where a predetermined condition regarding the operation target is satisfied, the form thereof may be changed. When the object is located on the periphery of the operation target, a parameter different from a parameter varying when the object touches the operation target may be changed When the object located on the periphery of the operation target, a second value may be added to a first value associated with the operation target.

14 Claims, 9 Drawing Sheets

(56) References Cited

U.S. PATENT DOCUMENTS

| | | |
|---|---|---|
| 7,059,962 B2 | 6/2006 | Watashiba |
| 2003/0032466 A1 | 2/2003 | Watashiba |
| 2020/0101380 A1* | 4/2020 | Nakagawa ............... A63F 13/35 |
| 2020/0164272 A1* | 5/2020 | Inaba ..................... A63F 13/822 |
| 2020/0246707 A1* | 8/2020 | Suzuki .................... A63F 13/79 |
| 2020/0298104 A1* | 9/2020 | Wang ..................... A63F 13/92 |

FOREIGN PATENT DOCUMENTS

| | | |
|---|---|---|
| JP | 2003-053035 | 2/2003 |
| JP | 2006-068125 | 3/2006 |

* cited by examiner

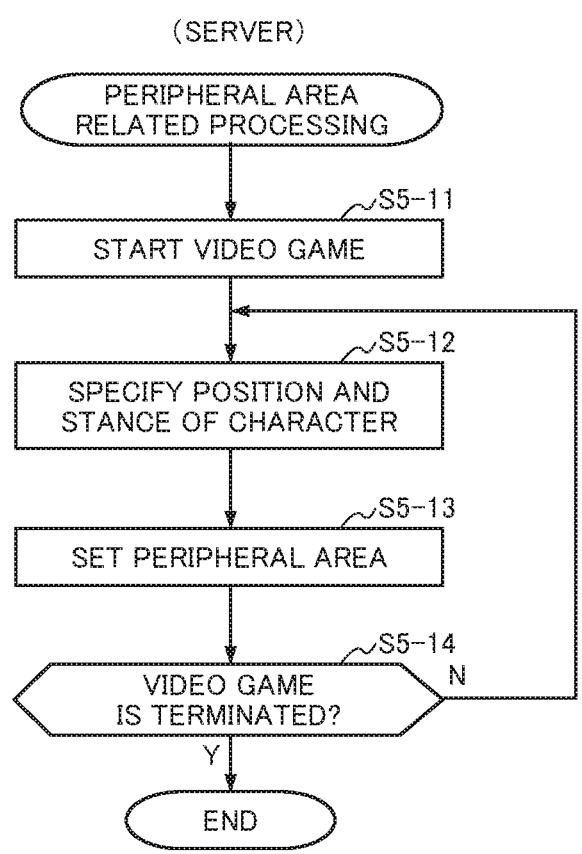

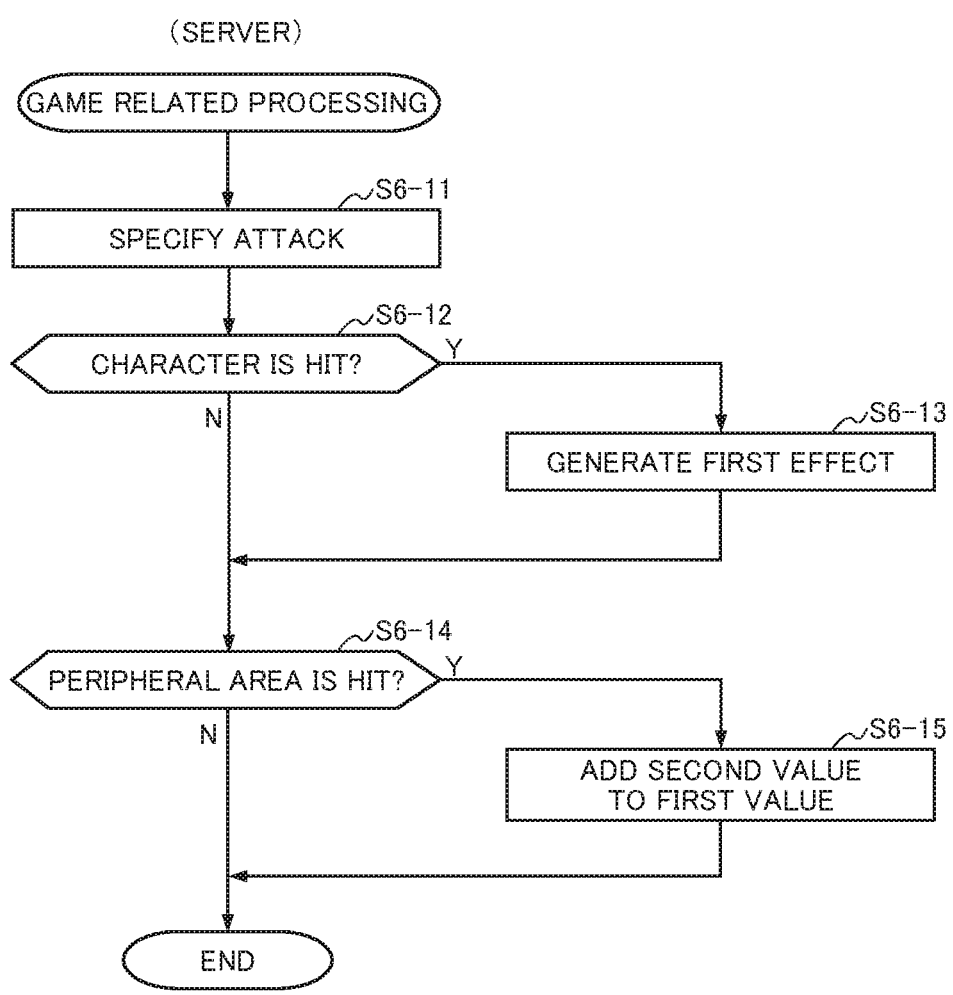

VIDEO GAME PROGRAM AND SYSTEM FOR GENERATING A STACK WHEN OBJECT PASSES THROUGH A PERIPHERAL AREA

TECHNICAL FIELD

At least one of embodiments according to the present invention relates to a program for causing a user terminal to realize functions to control progress of a video game. Further, at least one of the embodiments according to the present invention relates to a system for controlling progress of the video game, which includes a communication network, a server, and a user terminal. Further, at least one of the embodiments according to the present invention relates to a program for causing a server to realize functions to control progress of the video game.

BACKGROUND ART

Heretofore, for example, there is a video game system in which a virtual shooting game is executed so that the game is caused to proceed while attacking an attack target that is displayed on a screen.

Such a video game system determines success or failure of an attack by determining whether the attack hits a target or not; reduces physical strength of an opponent character if the attack is succeeded; and does not have an impact on the opponent character if the attack is failed (see Patent Document 1).

PRIOR ART DOCUMENTS

Patent Documents

Patent Document 1: Japanese Patent Application Publication No. 2003-053035

SUMMARY OF THE INVENTION

Problems to be Solved by the Invention

However, in such a video game system, it is often difficult to hit an attack against a target without a certain operating technique. For that reason, there have been cases where a user with a low operating technique cannot have any impact on something in a video game. Namely, in such a video game system, there are cases where a user cannot enjoy the fun of the video game unless the user has a certain operating technique.

It is an object of at least one embodiment of the present invention to provide a wide range of users with fun of the video game, and this makes it possible to improve the interest in or the taste of the video game.

Means for Solving the Problems

According to a non-limiting aspect, a program according to one embodiment of the present invention is a program for causing a user terminal to realize functions to control progress of a video game, wherein the functions include: a determining function configured to determine whether a predetermined object is located in a peripheral area in accordance with progress of the video game or not, the peripheral area being set as an operation target of a user; and a generating function configured to generate an effect (hereinafter, referred to as a "second effect") in a case where it is determined that the object is located in the peripheral area, the second effect being different from an effect that is generated in a case where the object touches the operation target (hereinafter, referred to as a "first effect").

According to a non-limiting aspect, a system according to one embodiment of the present invention is a system for controlling progress of a video game, the system comprising a communication network, a server, and a user terminal, the system including: a determining unit configured to determine whether a predetermined object is located in a peripheral area in accordance with progress of the video game or not, the peripheral area being set as an operation target of a user; and a generating unit configured to generate an effect (hereinafter, referred to as a "second effect") in a case where it is determined that the object Is located in the peripheral area, the second effect being different from an effect that is generated in a case where the object touches the operation target (hereinafter, referred to as a "first effect").

According to a non-limiting aspect, a program according to one embodiment of the present invention is a program for causing a server to realize functions to control progress of a video game, wherein the functions include: a determining function configured to determine whether a predetermined object is located in a peripheral area in accordance with progress of the video game or not, the peripheral area being set as an operation target of a user; and a generating function configured to generate an effect (hereinafter, referred to as a "second effect") in a case where it is determined that the object is located in the peripheral area, the second effect being different from an effect that is generated in a case where the object touches the operation target (hereinafter, referred to as a "first effect").

Effects of the Invention

According to each of the embodiments of the present application, one or two or more shortages are solved.

BRIEF DESCRIPTION OF THE DRAWINGS

FIG. 14 is a flowchart illustrating an example of peripheral area related processing corresponding to at least one of the embodiments according to the present invention.

FIG. 15 is a flowchart illustrating an example of game related processing corresponding to at least one of the embodiments according to the present invention.

DESCRIPTION OF THE EMBODIMENTS

Hereinafter, examples of embodiments according to the present invention will be described with reference to the drawings. In this regard, various kinds of elements in an example of each embodiment, which will be described below, can appropriately be combined with each other in a range where contradiction or the like did net occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like did not occur in the content of the processing.

First Embodiment

Figure 1:
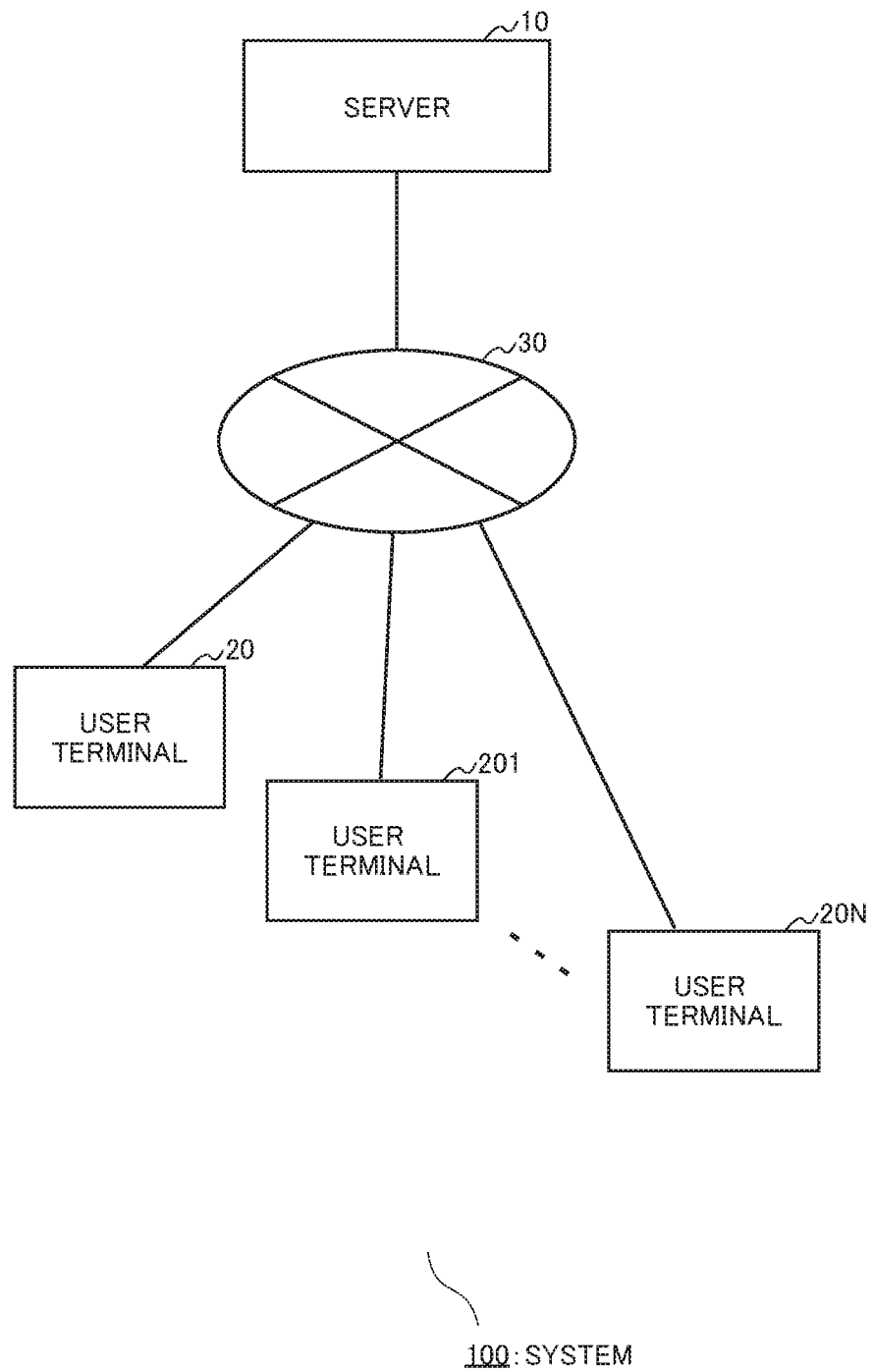
FIG. 1 is a block diagram illustrating an example of a configuration of a system corresponding to at least one of the embodiments according to the present invention.

FIG. 1 is a block diagram illustrating an example of a configuration of a system 100 according to one embodiment of the present invention. As illustrated in FIG. 1, the system 100 includes a server 10, and user terminals 20, and 201 to 20N respectively used by users of the system 100 ("N" is an arbitrary integer. Hereinafter, they are simply referred to as "terminals 20, and 201 to 20N"). In this regard, the configuration of the system 100 is not limited to this configuration. The system 100 may be configured so that a plurality of users uses a single terminal, or may be configured so as to include a plurality of servers.

Each of the server 10 and the plurality of terminals 20 and 201 to 20N is connected to a communication network 30 such as the Internet. In this regard, although it is not shown in the drawings, the plurality of terminals 20 and 201 to 20N is connected to the communication network 30 by carrying out data communication with base stations managed by a telecommunication carrier by means of a radio communication line.

The system 100 includes the server 10 and the plurality of terminals 20, and 201 to 20N, thereby executing various kinds of processes to control progress of a video game. The phase "progress of a video game" means various kinds of progress or changes and the like that can be generated in the video game. As examples of the phrase "various kinds of progress or changes and the like that can be generated in the video game", there are progress of time, a change in a parameter of a game element, update of a specific status or a flag, and the like.

The server 10 is managed by an administrator of the system 100, and has various kinds of functions to provide information regarding the various kinds of processes to each of the plurality of terminals 20, 201 to 20N. In the present embodiment, the server 10 is constructed by an information processing apparatus, such as a WWW server, and includes a storage medium for storing various kinds of information. In this regard, the server 10 is provided with a general configuration for carrying out the various kinds of processes, such as a control section, as a computer. However, its explanation herein is omitted. Further, in the system 103, it is preferable that the server 10 manages various kinds of information from a point of view to reduce a processing load on each of the plurality of terminals 20, 201 to 20N. However, a storage region may be provided in a state that the server 10 can access the storage region. For example, the server 10 may be configured so as to be provided with a dedicated storage region outside the server 10.

Figure 2:
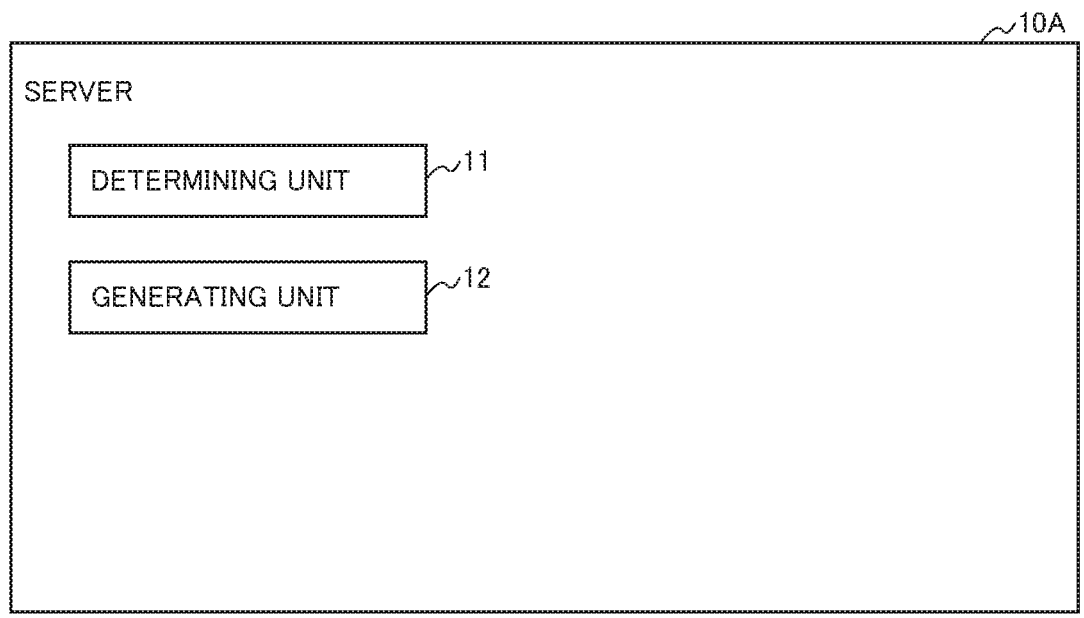
FIG. 2 is a block diagram illustrating a configuration of a server corresponding to at least one of the embodiments according to the present invention.

FIG. 2 is a block diagram illustrating a configuration of a server 10A, which is an example of the configuration of the server 10. As illustrated in FIG. 2, the server 10A at least includes a determining unit 11 (which corresponds to one example of a determining function) and a generating unit 12 (which corresponds to one example of a generating function).

The determining unit 11 has a function to execute a process for determining whether a predetermined object is located in a peripheral area in accordance with progress of the video game or not. The peripheral area is set for an operation target of a user. Here, the predetermined object means one contained in an image (reproduction target). As examples of the predetermined object, there are a character, an item, and an attack object, which appear in the video game. Further, the operation target of the user means a target that the user operates in the video game. The operation target is not limited particularly. However, it is suitable that the operation target is a target operated by the user regardless of whether it is operated directly or indirectly. As an example of the operation target, there is a player character. Further, the peripheral area set for the operation target means a part of a game space used for progress of the video game, which is an area set so as to occupy a certain area around the operation target. A configuration to set the peripheral area is not limited particularly. However, it is suitable that the peripheral area is configured to be set on the basis of a predetermined setting rule. As an example of such a configuration, there is a configuration in which the peripheral area is set so as to be adjacent to the operation target from the operation target to an area separated by a predetermined distance (or so as to cover the character). In this case, the peripheral area becomes narrow by overlapping the peripheral area in accordance with posture of the character. As another example, there are cells adjacent to a cell to which the operation target belongs (or peripheral cells thereof). In this regard, the peripheral area may be an area that the user can recognize visually, or an area that the user cannot recognize visually (for example, a transparent area). Further, the phrase "the object is located in the peripheral area" means that at least a part of the object is in contact with the peripheral area temporarily or continuously or exists in the peripheral area temporarily or continuously. As an example of the configuration to determine whether the object is located in the peripheral area or not, there is a configuration in which it is determined whether an object comes into collision with a peripheral area or not. As another example of the configuration to determine whether the object is located in the peripheral area or not, there is a configuration in which it is determined whether the object passes through the peripheral area or not. As still another example of the configuration to determine whether the object is located in the peripheral area or not, there is a configuration in which a time when the object stays in the peripheral area is determined.

The generating unit 12 has a function to execute a process for generating an effect (hereinafter, referred to as a "second effect") in a case where it is determined that the object is located in the peripheral area. The second effect is different from an effect that is generated in a case where the object touches the operation target (hereinafter, referred to as a "first effect"). Here, the phrase "the object touches the operation target" means that at least a part of the object is in contact with an area for contact determination of the operation target temporarily or continuously or exists in the area for the contact determination of the operation target temporarily or continuously. As an example of the case where the object touches the operation target, there is a case where the object comes into collision with an area for contact determination set to the operation target. Further, the effect means a result of an action by game processing set in advance. As an example of the affect (the first effect) that is generated in a case where the object touches the operation target, there is an effect that physical strength of the operation target is reduced. Further, as an example of the effect different from the first effect (the second effect), there is an effect that ability of the operation target is reduced. Further, a target for which an effect is generated means a target on which game processing set in advance is caused to act. As examples of the target for which the effect is generated, there are the operation target and an operating unit operated by the user (that is, a physical controller).

Each of the plurality of terminals 20, and 201 to 20N is managed by the user (or a player) who plays the video game, and is configured by a communication terminal, such as a cellular phone terminal, a PDA (Personal Digital Assistants), or a mobile game device, by which the user can play a network delivery type video game, for example. In this regard, a configuration of the terminal that the system 100 can include is not limited to the examples described above. It may be a configuration in which the user can recognize the video game. As other examples of the configuration of the terminal, there are a so-called wearable divide such as a smartwatch, and a combination of the wearable divide and the communication terminal.

Further, each of the plurality of terminals 20, and 201 to 20N is connected to the communication network 30, and includes hardware (for example, a display device for displaying a game screen, an audio output device and the like) and software for executing the video game by communicating with the server 10. In this regard, each of the plurality of terminals 20, and 201 to 20N may be configured so as to be capable of directly communicating with each other without the server 10. Further, each of the plurality of terminals 20, and 201 to 20N outputs an image of the video game to its own display device on the basis of information transmitted from the server 10 (for example, information regarding a game image).

Next, an operation of the system 100 according to the present embodiment will be described.

Figure 3:
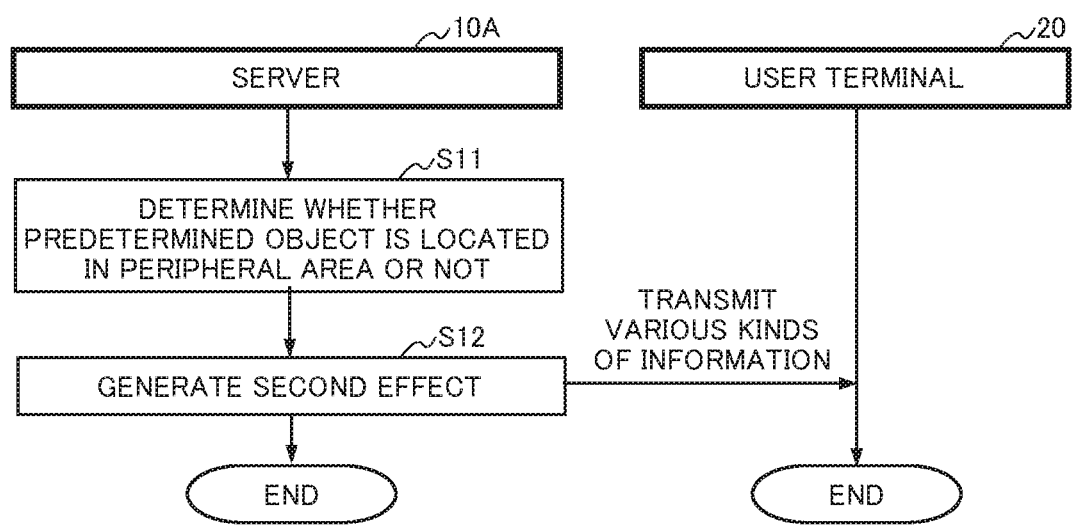
FIG. 3 is a flowchart illustrating an example of game related processing corresponding to at least one of the embodiments according to the present invention.

FIG. 3 is a flowchart illustrating an example of game related processing executed by the system 100. Hereinafter, a case where the server 10A and the terminal 20 execute transmission and reception of information regarding the video game will be described as an example. In this regard, the game related processing according to the present embodiment is executed in a case where an attack object OB is caused to fire toward a player character PC that is the operation target.

In the game related processing, the server 10A first determines whether a predetermined object is located in a peripheral area set to an operation target of the user (Step S11). In the present embodiment, the server 10A determines whether the attack object OB comes into collision with the peripheral area set to the player character PC.

In a case where it is determined that the predetermined object is located in the peripheral area, the server 10A generates a second effect different from a first effect (Step S12), and terminates the processing herein. In the present embodiment, the server 10A causes the player character PC not to generate the first effect, but generate the second effect, and transmits various kinds of information to the terminal 20 so that the user can recognize the generated effect.

Figure 4:
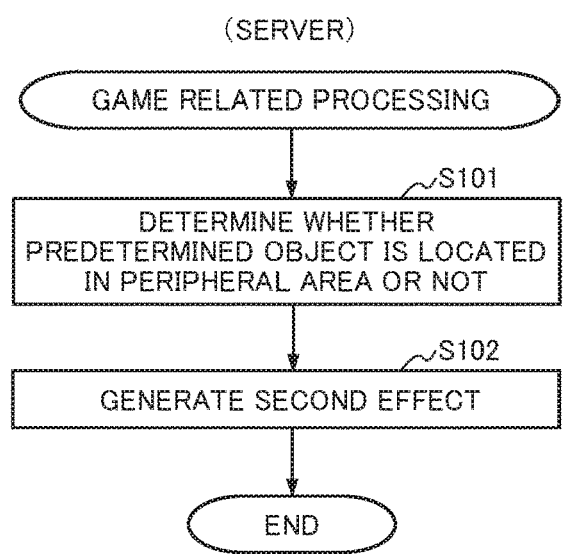
FIG. 4 is a flowchart illustrating an example of an operation at a server side in the game related processing corresponding to at least one of the embodiments according to the present invention.

FIG. 4 is a flowchart illustrating an example of an operation of the server 10A side in the game related processing. Here, an operation of the server 10A in the system 100 will be described again.

In the game related processing, the server 10A first determines whether a predetermined object is located in a peripheral area set to an operation target of the user (Step S101); generates a second effect different from a first effect in a case where it is determined that the predetermined object is located in the peripheral area (Step S102); and terminates the processing herein.

Figure 5:
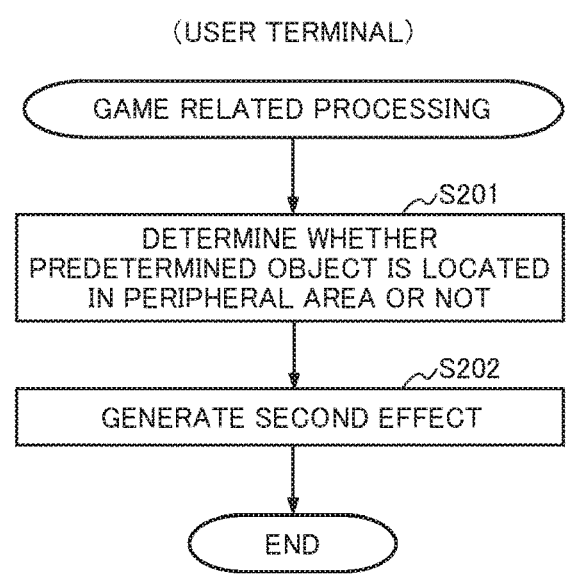
FIG. 5 is a flowchart illustrating an example of an operation of a terminal side in the game related processing corresponding to at least one of the embodiments according to the present invention.

FIG. 5 is a flowchart illustrating an example of an operation of the terminal 20 in a case where the terminal 20 executes the game related processing. Hereinafter, the case where the terminal 20 executes the game related processing by a single body will be described as an example. In this regard, the terminal 20 is configured to include similar functions to the configuration of the server 10A. For this reason, its description is omitted from a point of view to avoid repeated explanation.

In the game related processing, the terminal 20 first determines whether a predetermined object is located in a peripheral area set to an operation target of the user (Step S201); generates a second effect different from a first effect in a case where it is determined that the predetermined object is located in the peripheral area (Step S202); and terminates the processing herein.

As explained above, as one side of the first embodiment, the system 100 for controlling progress of the video game is configured so as to at least include the determining unit 11 and the generating unit 12. Thus, the determining unit 11 determines whether the predetermined object is located in the peripheral area set as the operation target of the user in accordance with progress of the video game or not, and the generating unit 12 generates the second effect different from the first effect in a case where it is determined that the object is located in the peripheral area. Therefore, it is possible to provide a wide range of users with fun of the video game, and this makes it possible to improve the interest in or the taste of the video game.

Namely, for example, even though the object does not touch the operation target (for example, even though an attack does not hit the operation target), a certain influence is exerted on something in the video game. For that reason, in view of the influence in the video game, the user causes the video game to proceed while becoming conscious of the peripheral area. Further, on the other hand, it is also similar to this with respect to an opponent. For that reason, by positioning the object in the peripheral area of the opponent, it is possible to generate an effect different from that in a case where the object touches the opponent. Therefore, it is also possible for the user to adopt strategy such that the object is positioned in the peripheral area of the opponent in an intended manner. Therefore, since the system 100 can expand the range of choices of the user, it is possible to provide a wide range of users with fun of the video game, and this makes it possible to improve the interest in or the taste of the video game.

Second Embodiment

Figure 6:
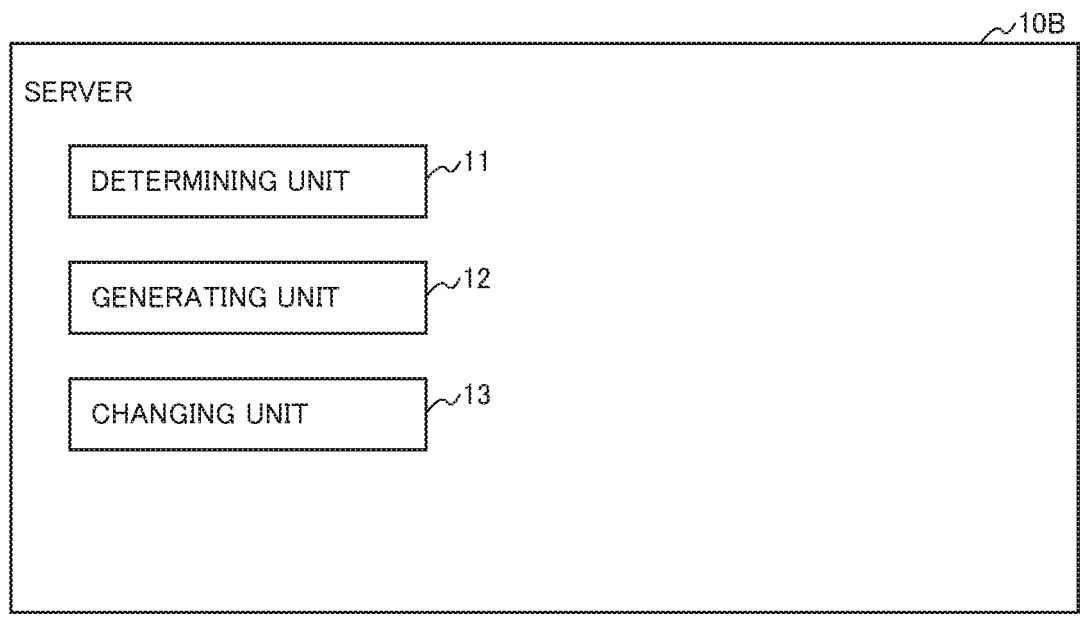
FIG. 6 is a block diagram illustrating a configuration of a server corresponding to at least one of the embodiments according to the present invention.

FIG. 6 is a block diagram illustrating a configuration of a server 10B, which is an example of the server 10. In the present embodiment, the server 10B at least includes a determining unit 11, a generating unit 12, and a changing unit 13 (which corresponds to one example of a changing function).

The changing unit 13 has a function to execute a process for changing a form of a peripheral area in a case where a predetermined condition regarding an operation target is satisfied. Here, the predetermined condition may be related to the operation target, and is not limited particularly. As an example of the predetermined condition, there is a condition that the operation target carries out a predetermined action. As another example thereof, there is a condition that the operation target equips predetermined equipment. As still another example thereof, there is a condition that the operation target uses predetermined skill. Further, the phrase "changing a form of a peripheral area" means that a shape or size of the peripheral area is changed. A configuration to change the form of the peripheral area is not limited particularly. However, it is suitable that it is configured so that the setting rule for setting the peripheral area is changed and the form is deformed on the basis of the changed setting rule. As an example of such a configuration, there is a configuration in which a peripheral area becomes smaller in a case where an operation target carries out a predetermined motion (for example, in a case where the operation target crouches down). Further, a configuration to make the peripheral area smaller is not limited particularly. As an example of the configuration to make the peripheral area smaller, there is a configuration in which a distance from an operation target set as a peripheral area is made shorter (that is, a setting rule for setting tie peripheral area is changed).

Figure 7:
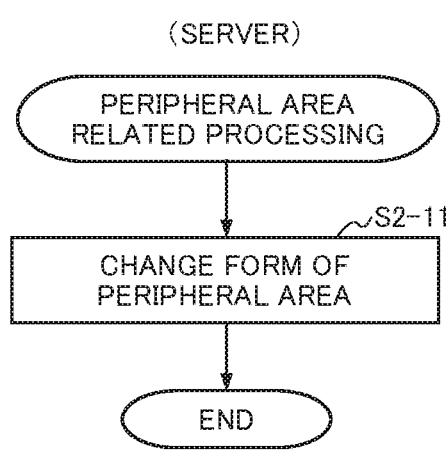
FIG. 7 is a flowchart illustrating an example of peripheral area related processing corresponding to at least one of the embodiments according to the present invention.

FIG. 7 is a flowchart illustrating an example of peripheral area related processing executed by the system 100. Hereinafter, an operation of the server 103 side will be described as an example. In this regard, explanation for a case where the terminal 20 (that is, the terminal 20 that includes similar functions to the configuration of the server 10B) executes the peripheral area related processing by a single body, and portions that have already been explained are omitted from a point of view to avoid repeated explanation. In the present embodiment, a case where the peripheral area is set will be described as an example.

In the peripheral area related processing, the server 10B first changes a form of a peripheral area in a case where a predetermined condition regarding an operation target is satisfied (Step S2-11), terminates the processing herein.

As explained above, as one side of the second embodiment, the system 100 is configured so as to at least include the determining unit 11, the generating unit 12, and the changing unit 13. Thus, the changing unit 13 changes the form of the peripheral area in a case where the predetermined condition regarding the operation target is satisfied. Therefore, it is possible to provide a wide range of users with fun of the video game, and this makes it possible to improve the interest in or the taste of the video game.

Namely, the form of the peripheral area is changed depending upon a status of the operation target. For that reason, the system 100 can reflect play skill and strategy of the user to the video game in a stage of making up the operation target or a stage of operating the operation target. Therefore, it is possible to expand the range of choices of the user, it is possible to provide a wide range of users with fun of the video game, and this makes it possible to improve the interest in or the taste of the video game.

Third Embodiment

Figure 8:
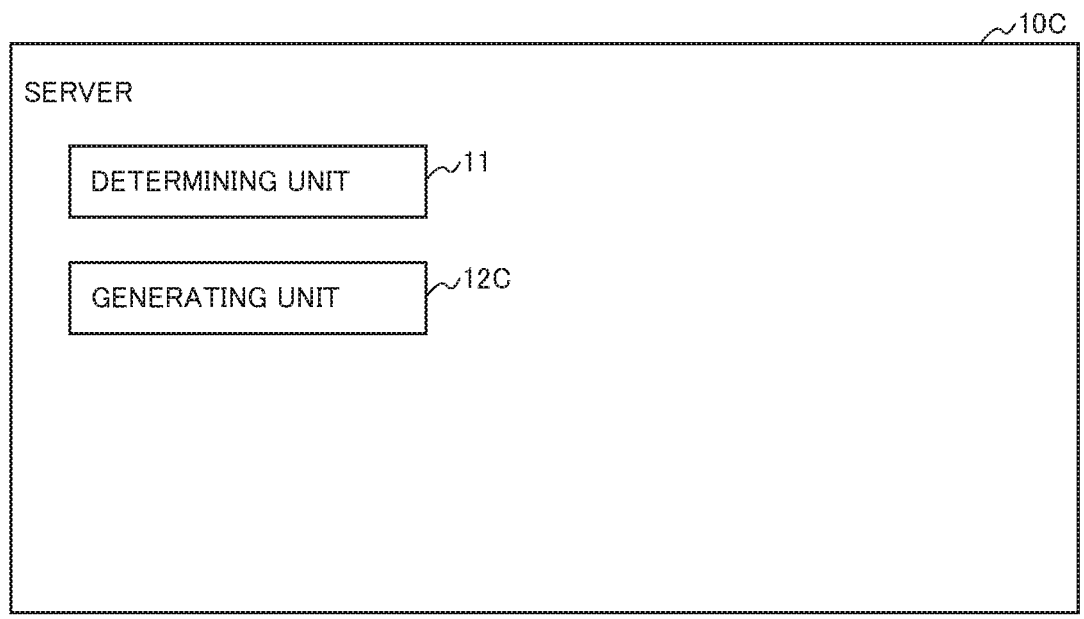
FIG. 8 is a block diagram illustrating a configuration of a server corresponding to at least one of the embodiments according to the present invention.

FIG. 8 is a block diagram illustrating a configuration of a server 10C, which is an example of the server 10. In the present embodiment, the server 10C at least includes a determining unit 11 and a generating unit 12C (which corresponds to one example of a generating function).

The generating unit 12C has a function to execute a process for generating, as a second effect, an effect that a parameter different from a parameter changing in accordance with generation of a first effect is varied. Here, the parameter means one of elements that constitutes a target (for example, a character). As an example of the parameter changing in accordance with generation of the first effect, there is physical strength of an operation target. Further, as examples of a parameter changing in accordance with generation of the second effect, there are offensive power of the operation target and a hit probability.

Figure 9:
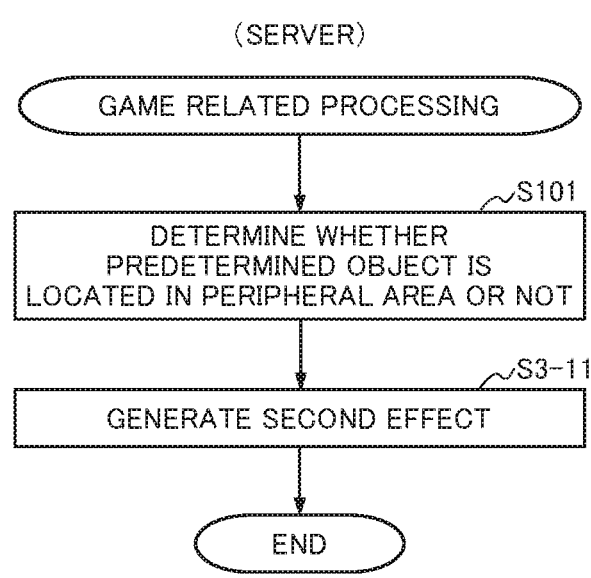
FIG. 9 is a flowchart illustrating an example of game related processing corresponding to at least one of the embodiments according to the present invention.

FIG. 9 is a flowchart illustrating an example of game related processing executed by the system 100. Hereinafter, an operation of the server 10C side will be described as an example. In this regard, explanation for a case where the terminal 20 (that is, the terminal 20 that includes similar functions to the configuration of the server 10C) executes the game related processing by a single body, and portions that have already been explained are omitted from a point of view to avoid repeated explanation.

In a case where it is determined that a predetermined object is located in a peripheral area, the server 10C generates, as a second effect, an effect that a parameter different from a parameter changing in accordance with generation of a first effect is varied (Step S3-11), and terminates the processing herein. In the present embodiment, the server 10C does not generate an effect that physical strength of a player character PC is reduced (that is, the first effect), but generates an effect that a hit probability of the player character PC is reduced (that is, the second effect).

As explained above, as one side of the third embodiment, the system 100 is configured so as to at least include the determining unit 11 and the generating unit 12C. Thus, the generating unit 12C generates, as the second effect, the effect that the parameter different from the parameter changing in accordance with generation of the first effect is varied. Therefore, it is possible to provide a wide range of users with fun of the video game, and this makes it possible to improve the interest in or the taste of the video game.

Fourth Embodiment

Figure 10:
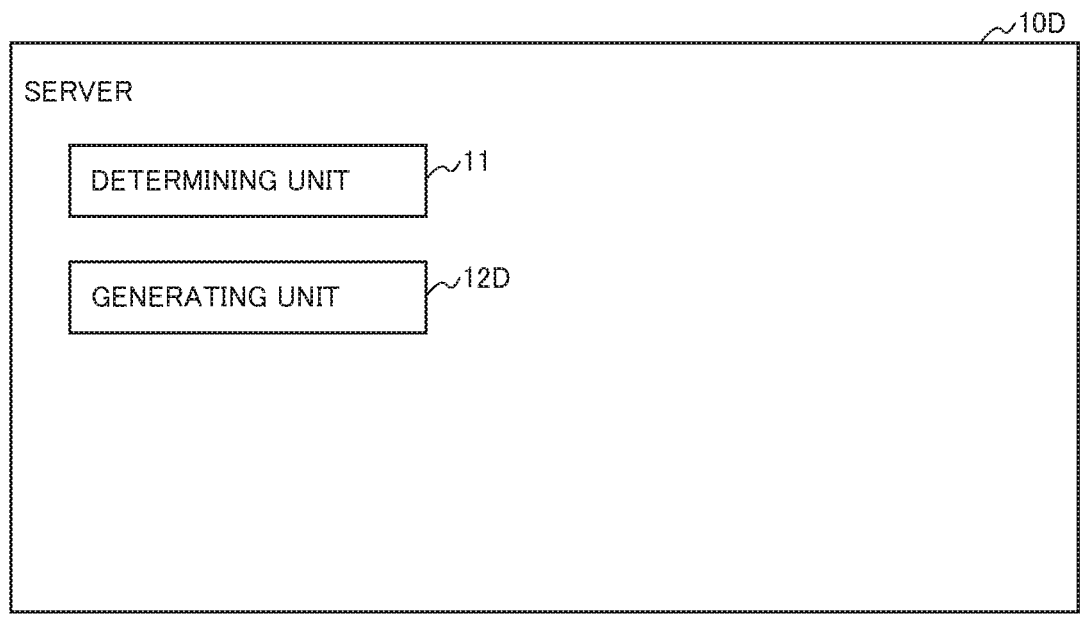
FIG. 10 is a block diagram illustrating a configuration of a server corresponding to at least one of the embodiments according to the present invention.

FIG. 10 is a block diagram illustrating a configuration of a server 10D, which is an example of the server 10. In the present embodiment, the server 10D at least includes a determining unit 11 and a generating unit 12D (which corresponds to one example of a generating function).

The generating unit 12D has a function to execute a process for generating, as a second effect, an effect that a second value is added into a first value associated with an operation target. Here, the first value is a variable value that varies due to various kinds of factors. A configuration of the first value is not limited particularly. However, it is suitable that the first value is configured so that a lower limit and an upper limit are defined and an influence on the operation target differs depending upon a current value. Further, as examples of the various kinds of factors, there are a state of the operation target, a second value, and a lapse of time. Here, the second value is a value that is added to the first value (an added value). The second value is not limited particularly. However, it is suitable that the second value is a predetermined fixed value for every generation. In such an example, it is suitable that the second value is configured so that the first value reaches the upper limit of the first value by adding the second value to the first value multiple times (for example, from five times to six times) by means of the generating unit 12D.

Figure 11:
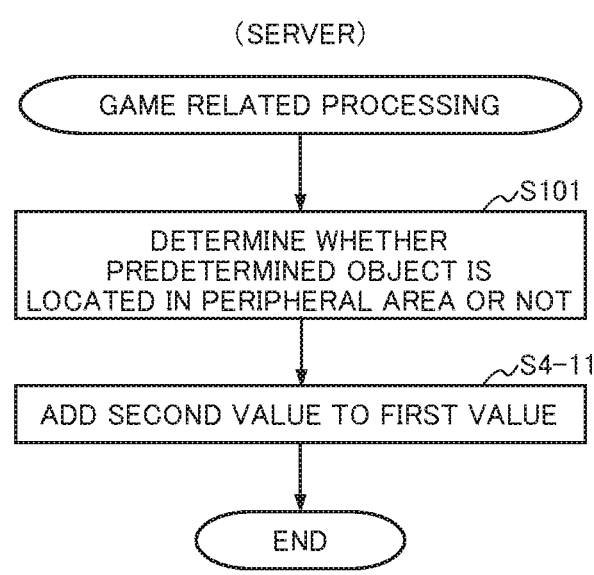
FIG. 11 is a flowchart illustrating an example of game related processing corresponding to at least one of the embodiments according to the present invention.

FIG. 11 is a flowchart illustrating an example of game related processing executed by the system 100. Hereinafter, an operation of the server 10B side will be described as an example. In this regard, in this example, explanation for a case where the terminal 20 (that is, the terminal 20 that includes similar functions to the configuration of the server 10D) executes the game related processing by a single body, and portions that have already been explained are omitted from a point of view to avoid repeated explanation.

In a case where an object is located in a peripheral area, the server 10D adds a second value to a first value (Step S4-11), and terminates the processing herein. In the present embodiment, the system 100 increases the variable value in accordance with passage of the object through the peripheral area.

As explained above, as one side of the fourth embodiment, the system 100 is configured so as to at least include the determining unit 11 and the generating unit 12D. Thus, the generating unit 12D generates, as the second effect, the effect that the second value is added into the first value associated with the operation target. Therefore, it is possible to provide a wide range of users with fun of the video game, and this makes it possible to improve the interest in or the taste of the video game.

Namely, by positioning the object in the peripheral area, it possible to accumulate the second value. This causes a strategic attack to be executed against the peripheral area. Therefore, the system 100 can provide a wide range of users with fun of the video game, and this makes it possible to improve the interest in or the taste of the video game.

Fifth Embodiment

In the present embodiment, a system 100 controls progress of a shooting game in which users are divided into friends and enemies and they attack the others each other (for example, fire a bullet each other) in a virtual game space (or a virtual space). In order to accomplish a specific purpose in a video game, a user of the video game operates a player character that becomes an operation target. The specific purpose mentioned herein means, for example, conditions for becoming a winner such as defeat of as many enemies as possible, or occupation of a specific point.

The player character attacks an enemy character. For example, the player character fires a bullet against the enemy character. When the attack takes in (or hits) the enemy character, physical strength of the enemy character is decreased. When the physical strength thereof becomes zero, the enemy character is defeated. Such hit becomes a first hit element (hereinafter, referred to as "direct hit") for each character.

Even in a case where the attack does not hit the enemy character, it is possible to expect a certain effect. This is a case where an attack that does not hit an enemy character passes a peripheral area of the enemy character. In this case, since the attack does not hit the enemy character, no influence is exerted on the physical strength of the enemy character. However, a value different from a value when the influence is exerted on the physical strength is accumulated. Then, it is disadvantageous for the enemy character as the value is accumulated. The hit on the peripheral area becomes a second hit element (hereinafter, referred to as "peripheral hit") for each character.

The system 100 includes a server 10Z and user terminals 20, and 201 to 20N ("N" is an arbitrary integer. Hereinafter, they are simply referred to as "terminals 20, and 201 to 20N"). In this regard, a configuration of the system 100 is not limited to this, and the system 100 may be configured so that a plurality of users uses a single terminal.

The server 10Z has various kinds of functions to cause the video game to proceed. For example, the server 10Z has a function to process various kinds of information regarding each character in the virtual space. Further, the server 10Z has various kinds of functions to provide each of the plurality of terminals 20, and 201 to 20N with information for displaying a game image. Further, the server 10Z has various kinds of functions to communicate with an external apparatus such as the terminals 20, and 201 to 20N via a communication network 30. In the present embodiment, the server 10Z is constructed by an information processing apparatus such as a WWW server. and includes a storage medium for storing the various kinds of information. In this regard, the server 10Z may be configured so as to be provided with a storage region in a state that the server 10Z can access the storage region. For example, the system 100 may be configured so as to be provided with the storage region outside the system 100.

Figure 12:
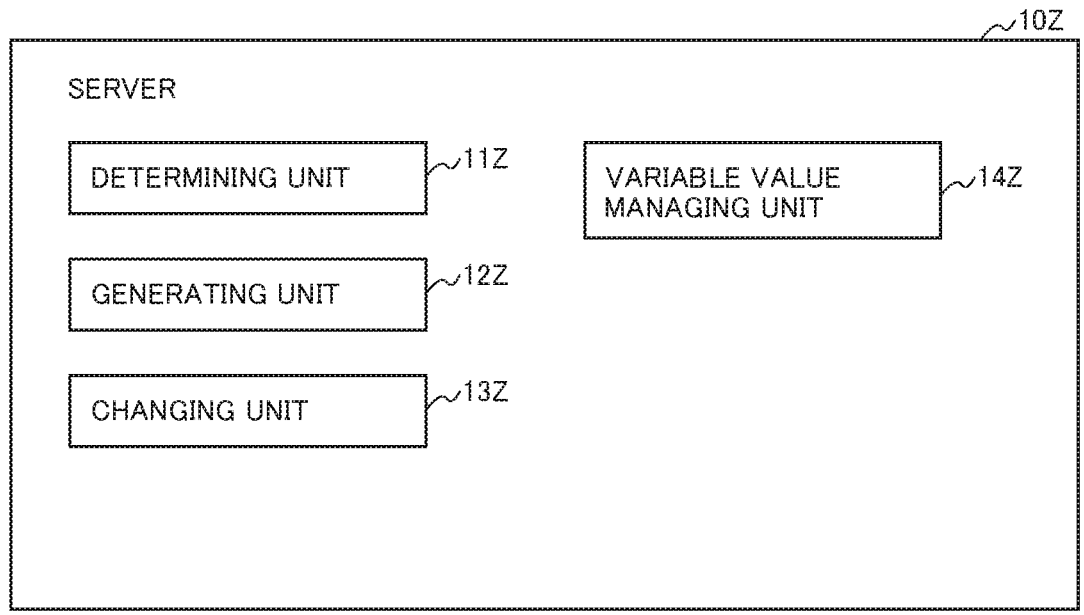
FIG. 12 is a block diagram illustrating a configuration of a server corresponding to at least one of the embodiments according to the present invention.

FIG. 12 is a block diagram illustrating a configuration of the server 10Z that is an example of the server 10. In the present embodiment, the server 102 at least includes a determining unit 11Z (which corresponds to one example of a determining function), a generating unit 12Z (which corresponds to one example of a generating function), a the changing unit 13Z (which corresponds to one example of a changing function), and a variable value managing unit 14Z (which corresponds to one example of a variable value managing function).

The determining unit 11Z has a function to execute a process for determining presence or absence of a hit element. As described above, in the present embodiment, there are two hit elements including direct hit and peripheral hit. A configuration to determine presence or absence of the hit element is not limited particularly. However, it is suitable that the determining unit 11Z is configured to determine whether an object comes into collision with at least one of the characters and the peripheral area thereof. In this regard, as "at least one" is described, the direct hit and the peripheral hit may have a coexistence relationship or an exclusive relationship. For example, it may be configured so that preference order is provided and determination for one is not required in a case where it is determined that the attack hits the other. Namely, it may be configured so as to raise the preference order for determination of the direct hit and determine presence or absence of the peripheral hit by a bullet that does not directly hit the character. In the present embodiment, the determining unit 11Z determines presence or absence of the peripheral hit on the basis of coordinate information on each virtual space. Further, with respect to the peripheral hit according to the present embodiment, a hit position is not considered. Namely, the determining unit 11Z determines only whether the attack hits the character or not. Further, the determining unit 11Z according to the present embodiment is configured to determine whether the hit attack is an attack that can be dealt with as the peripheral hit or not. In the present embodiment, the determining unit 11Z determines whether an attack that has an attribute permitted as the peripheral hit comes into collision with the peripheral area or not. In this regard, timing when presence or absence of the hit element is determined is not limited particularly. For example, the determining unit 11Z may be configured so as to determine, at a stage that an object intrudes a peripheral area, whether direct hit is generated or not from information on a trajectory and a speed of the object. According to such a configuration, it is possible to reduce a time after generation of the peripheral hit up to determination of presence or absence of the direct hit.

The generating unit 12Z has a function to execute a process for generating various kinds of effects. Here, an effect at the time of the direct hit (that is, a first effect) is different from an effect at the time of the peripheral hit (that is, a second effect). As an example of the effect at the time of the direct hit, there is an effect that physical strength of a character is reduced. In other words, the effect at the time of the direct hit is an effect that directly influences on accomplishment of the purpose in the video game (for example, victory). Namely, a player who causes the direct hit to be generated approaches the accomplishment of the purpose. On the other hand, as an example of the effect at the time of the peripheral hit, there is an effect that an element other than the physical strength of the character varies. In other words, the effect at the time of the peripheral hit is an effect that supplementally (or indirectly) influence on the accomplishment of the purpose. Specifically, elements such as obstruction or harassment are contained in the effect at the time of the peripheral hit. As another example of the effect at the time of the peripheral hit, it is not an effect regarding the character, but there is an effect that a change is applied to sound, a game image that the user visually recognizes or a controller operated by the user.

Further, an accidental effect that results in update of a parameter as the second effect is contained in the effect at the time of the peripheral hit (the second effect). Namely, a case where a predetermined parameter is raised at the time of peripheral hit and a disadvantageous effect is generated for a character in accordance with rise in the predetermined parameter is explained as an example. Both "the predetermined parameter is raised" and "the disadvantageous effect is generated for the character" correspond to the second effect according to the present embodiment. In this regard, as an example of the disadvantageous effect that is generated for the character, there is an effect that a hit probability based on rise in a predetermined parameter is reduced.

In this regard, the effect at the time of the peripheral hit may be configured so as to be higher than the effect at the time of the direct hit. As an example of such a configuration, there is a configuration in which peripheral hit is prioritized in a situation at that time, for example, physical strength is further reduced in a situation that direct hit occurs while a specific effect is generated by the peripheral hit compared with a situation that only the direct hit occurs.

The changing unit 13Z has a function to execute a process for setting a peripheral area. The changing unit 13Z sets a spherical object so as to surround the character. This spherical object becomes a collision object. The degree of transparency or color of the collision object is not limited particularly. The spherical object is defined on the basis of a predetermined setting rule. As one example of the predetermined setting rule, there is one in which a radius of the spherical object is determined on the basis of a state of the character (for example, a stance). As an example of the setting rule, there is one in which: a radius when the character is in a standing state is set to 1.00 m; a radius when the state is changed in response to a user operation (for example, a crouching state) is set to 0.75 m; a radius when a position of the character satisfies a predetermined condition (for example, in the air) is set to 1.00 m; and a radius when the state of the character satisfies a specific condition (for example, at the time of a dying state that is set regardless of any operation of the user) is set to 0.67 m. As an example of the dying state, there is a state where a character that is seriously injured is in a state of crawling on all fours and is incapable of moving. Namely, in the present embodiment, the changing unit 13Z sets the spherical object with a radius based on the stance (or a status) of the character.

Figure 13:
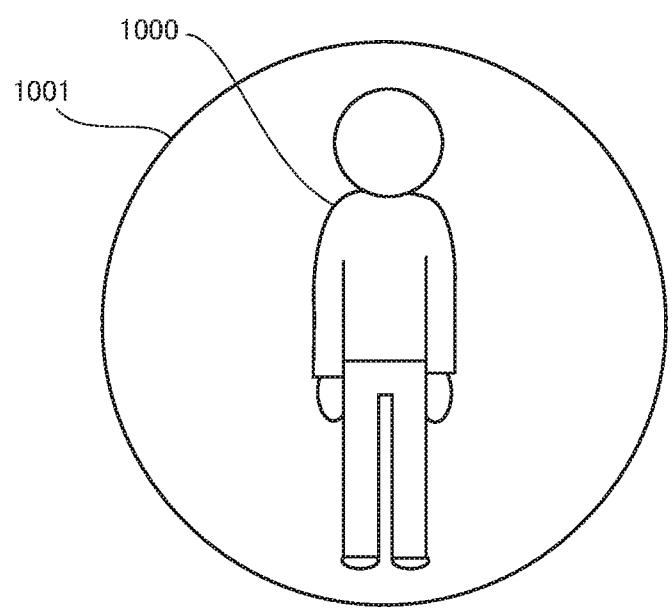
FIG. 13 is an explanatory drawing for explaining an example of concept corresponding to at least one of the embodiments according to the present invention.

FIG. 13 is an explanatory drawing for explaining a concept of the peripheral area. As illustrated in FIG. 13, a collision object 1001 is formed so as to enclose a periphery of a character 1000. Thus, a hit area (that is, an area where an influence is exerted on the game) is dramatically increased compared with a case where an attack merely hits the character, whereby it is possible to improve fun of the video game.

In this regard, an element to constitute the predetermined setting rule is not a stance, but may be a size of the character itself. Namely, the peripheral area may be configured so as to be influenced by the size of the character itself. For example, the predetermined setting rule may be configured so that a character with an L size has a peripheral area with an L size and a character with an S size has a peripheral area with an S size. The element that constitutes the predetermined setting rule is not a stance, but may be an item or skill. Namely, the peripheral area may be configured so as to be influenced by the item or the skill. Further, the peripheral area may be configured so as to be set on the basis of the position of the character. However, the peripheral area is not limited to such a configuration. For example, the system 100 may be configured so as to create a character model containing a peripheral area.

The variable value managing unit 142 has a function to execute a process for managing a variable value (that is, a first value) that varies depending upon various kinds of factors. A configuration of the variable value is not limited particularly. However, it is suitable that the variable value managing unit 14Z is configured so that a lower limit and an upper limit are defined for the first value and an influence on the operation target differs depending upon a current value. Further, as examples of the various kinds of factors, there are a state of the operation target, a second value, and a lapse of time. Here, the second value is an added value for increasing the first value. The second value may be a predetermined fixed value for every generation. However, the second value is not limited to such a configuration. It is suitable that the second value is configured so that the first value reaches the upper limit of the first value by adding the second value to the first value multiple times (for example, from five times to six times) by means of the variable value managing unit 14Z.

Each of the plurality of terminals 20, and 201 to 20N is managed by the user (or a player) who plays the video game, and is configured by a communication terminal, such as a cellular phone terminal, a PDA (Personal Digital Assistants), or a mobile game device, by which the user can play a network delivery type video game, for example. In this regard, a configuration of the terminal that the system 100 can include is not limited to the examples described above. It may be a configuration in which the user can recognize the video game. As other examples of the configuration of the terminal, there are a so-called wearable divide such as a smartwatch, and a combination of the wearable divide and the communication terminal.

Further, each of the plurality of terminals 20, and 201 to 20N is connected to the communication network 30, and includes hardware (for example, a display device for displaying a game screen, an audio output device and the like) and software for executing the video game by communicating with the server 10Z. In this regard, each of the plurality of terminals 20, and 201 to 20N may be configured so as to be capable of directly communicating with each other without the server 10Z. Further, each of the plurality of terminals 20, and 201 to 20N outputs an image of the video game to its own display device on the basis of information transmitted from the server 10Z (for example, information regarding a game image).

Next, an operation of the system 100 according to the present embodiment will be described. In the present embodiment, a case where a process for setting a peripheral area (peripheral area related processing) and a process for determining whether an attack hit a character or not (game related processing) are executed separately will be described as an example. In this regard, in the present embodiment, a case where processes regarding progress of a video game (including movement of a character and an occurrence in the virtual space) are executed separately will be described.

FIG. 14 is a flowchart illustrating an example of the peripheral area related processing executed by the system 100. Hereinafter, an operation of the server 10Z will be described as an example. In this regard, explanation for a case where the terminal 20 (that is, the terminal 20 that includes similar functions to the configuration of the server 10Z) executes the game related processing by a single body, and portions that have already been explained are omitted from a point of view to avoid repeated explanation.

In the peripheral area related processing, the server 10Z first starts a video game (Step S5-11). In the present embodiment, the server 10Z receives a game start operation from a user terminal of a user who participates in the video game, and starts the video game in a case where a start condition is satisfied.

Subsequently, the server 10Z specifies a position and a stance of each character in a virtual space (Step S5-12). In the present embodiment, the server 10Z refers to information regarding progress of the video game, and specifies information regarding the position and the stance of each character. Further, the server 10Z herein specifies the information while limiting characters each having a peripheral area (for example, a character having a peripheral hit attribute).

Subsequently, the server 10Z sets a peripheral area on the basis of the position and the stance thus obtained (Step S5-13). In the present embodiment, the server 10Z stores information on the peripheral area set to each character so that the information can be referred to in various kinds of processes. As one example, the server 10Z updates (or changes) information regarding progress of the video game (for example, information regarding each character).

Subsequently, the server 10Z determines whether the video game is terminated or not (Step S5-14). In a case where it is determined that the video game is not terminated ("N" at Step S5-14), the server 10Z causes the processing flow to shift to Step S5-12, and specifies the position and the stance of each character in the virtual space again. On the other hand, in a case where it is determined that the video game is terminated ("Y" at Step S5-14), the server 10Z terminates the processing herein.

Next, game related processing executed by the system 100 will be described.

FIG. 15 is a flowchart illustrating an example of the game related processing executed by the system 100. Hereinafter, an operation of the server 10Z will be described as an example. In this regard, explanation for a case where the terminal 20 (that is, a terminal 20 that includes similar functions to the configuration of the server 10Z) executes the game related processing by a single body, and portions that have already been explained are omitted from a point of view to avoid repeated explanation. Further, the game related processing according to the present embodiment is started in a case where an attack is generated. Further, a case where the game related processing is executed for one attack unit will be described.

In the game related processing, the server 10Z first specifies a generated attack (Step S6-11). In the present embodiment, the server 10Z refers to information regarding progress of a video game, and specifies the generated attack.

The server 10Z determines whether the generated attack hits a character or not (Step S6-12). In the present embodiment, the server 10Z refers to the information regarding progress of the video game, and determines whether the attack comes (or come) into collision with the character or not. More specifically, the server 10Z determines whether a hit area of the attack comes into collision with an area that is determined as direct hit of the character or not.

In a case where it is determined that the generated attack does not hit the character ("N" at Step S6-12), the server 10Z causes the processing flow to shift to Step S6-14. On the other hand, in a case where it is determined that the generated attack hits the character ("Y" at Step S6-12), the server 10Z generates a first effect (Step S6-13). In the present embodiment, the server 10Z generates a first effect in which physical strength of the hit character is reduced.

Subsequently, the server 10Z determines whether the generated attack hits a peripheral area of the character or not (Step S6-14). In the present embodiment, the server 10Z refers to the information regarding progress of the video game, and determines whether the attack comes (or come) into collision with the peripheral area or not. More specifically, the server 102 determines whether the hit area of the attack comes into collision with the peripheral area or not.

In a case where it is determined that the generated attack does not hit the peripheral area ("N" at Step S6-14), the server 10Z terminates the processing herein. On the other hand, in a case where it is determined that the generated attack hits the peripheral area ("Y" at Step S6-14), the server 10Z generates a second effect by adding a second value to a first value (Step S6-15), and terminates the processing herein. In the present embodiment, the server 10Z adds the second value to the first value of the hit character, and generates the second effect by applying a change based on variation in the first value to the character.

As explained above, as one side of the fifth embodiment, the system 100 for controlling progress of the video game is configured so as to at least include the determining unit 11Z and the generating unit 12Z. Thus, the determining unit 11Z determines whether the predetermined object is located in the peripheral area set as the operation target of the user in accordance with progress of the video game or not; and the generating unit 12Z generates the second effect different from the first effect in a case where it is determined that the object is located in the peripheral area. Therefore, it is possible to provide a wide range of users with fun of the video game, and this makes it possible to improve the interest in or the taste of the video game.

Namely, for example, even though an attack does not hit a character as the operation target, disadvantage is generated For that reason, the user causes the video game to proceed in view of disadvantage that may be generated while becoming conscious of the peripheral area. Further, on the other hand, it is also similar to this with respect to an opponent. For that reason, even though an attack does not hit a character as the operation target, it is possible to generate an effect different from that at the time of hit. Therefore, it is also possible to adopt strategy in which a peripheral area of an opponent is attacked in an intended manner. In particular, it is possible to provide even a beginner, for whom it is difficult to hit an opponent, with a role that the beginner can play. Therefore, since the system 100 can expand the range of choices of the user, it is possible to provide a wide range of users with fun of the video game, and this makes it possible to improve the interest in or the taste of the video game.

Further, as one side of the fifth embodiment, the system 100 is configured so as to at least include the determining unit 11Z, the generating unit 12Z, and the changing unit 13Z. Thus, the changing unit 13Z changes the form of the peripheral area in a case where the predetermined condition regarding the operation target is satisfied. Therefore, it is possible to provide a wide range of users with fun of the video game, and this makes it possible to improve the interest in or the taste of the video game.

Namely, the form of the peripheral area is changed depending upon a situation or a status of the character as the operation target. For that reason, the system 100 allows the user to reflect play skill and strategy of the user to the video game in a stage of making up the operation target or a stage of operating the operation target. Therefore, it is possible to expand the range of choices of the user, and this makes it possible to improve the interest in or the taste of the video game.

Further, as one side of the fifth embodiment, the system 100 is configured so as to at least include the determining unit 11Z and the generating unit 12Z. Thus, the generating unit 12Z generates, as the second effect, the effect that the parameter different from the parameter changing in accordance with generation of the first effect is varied. Therefore, it is possible to provide a wide range of users with fun of the video game, and this makes it possible to improve the interest in or the taste of the video game.

Further, as one side of the fifth embodiment, the system 100 is configured so as to at least include the determining unit 11Z and the generating unit 12Z. Thus, the generating unit 12Z generates, as the second effect, the effect that the second value is added into the first value associated with the operation target in a case where it is determined that the object is located in the peripheral area. Therefore, it is possible to provide a wide range of users with fun of the video game, and this makes it possible to improve the interest in or the taste of the video game.

Namely, accumulation of the attack against the peripheral area also becomes fun or pleasure of the game. This causes the user to execute a strategic attack against the peripheral area. Therefore, the system 100 can provide a wide range of users with fun of the video game, and this makes it possible to improve the interest in or the taste of the video game.

In this regard, although it has not been mentioned particularly in the embodiments described above, the system 100 may be configured so as not to execute hit determination against a friend character.

As explained above, each of the embodiments of the present application solves one or two or more shortages. In this regard, the effects by each of the embodiments are non-limiting effects or one example of the non-limiting effects.

In this regard, in each of the embodiments described above, each of the plurality of user terminals 20, 201 to 20N and the server 10 carries out the various kinds of processing described above in accordance with various kinds of control programs (for example, a program) stored in the storage device with which the corresponding terminal or server is provided. A control unit (not illustrated in the drawings particularly) may be configured so as to have functions to execute processes that are respectively to be executed by the units 11Z to 14Z.

Further, the configuration of the system 100 is not limited to the configuration that has been explained as an example of each of the embodiments described above. For example, the system 100 may be configured so that the server 10 carries out a part or all of the processes that have been explained as the processes carried out by the user terminal. Alternatively, the system 100 may be configured so that any of the plurality of user terminals 20, 201 to 20N (for example, the user terminal 20) carries out a part or all of the processes that have been explained as the processes carried out by the server 10. Further, the system 100 may be configured so that a part or all of the storing sections included in the server 10 is included in any of the plurality of user terminals 20, 201 to 20N. Namely, the system 100 may be configured so that a part or ail of the functions of any one of the user terminal 20 and the server 10 according to the system 100 is included in the other.

(Appendix)

The explanation of the embodiments described above has been described so that the following inventions can be at least realized by a person having a normal skill in the art to which the present invention belongs.

(1)

A program for causing a user terminal to realize functions to control progress of a video game, wherein the functions include:

a determining function configured to determine whether a predetermined object is located in a peripheral area in accordance with progress of the video game or not, the peripheral area being set as an operation target of a user; and a generating function configured to generate an effect (hereinafter, referred to as a "second effect") in a case where it is determined that the object is located in the peripheral area, the second effect being different from an effect that is generated in a case where the object touches the operation target (hereinafter, referred to as a "first effect").

(2)
The program according to (1),
wherein the functions further include:
a changing function configured to change a form of the peripheral area of the operation target in a case where a predetermined condition regarding the operation target is satisfied.
(3)
The program according to (1) or (2),
wherein the generating function includes a function configured to generate, as the second effect, an effect that a parameter different from a parameter changing in accordance with generation of the first effect is varied.
(4)
The program according to any one of (1) to (3),
wherein the generating function includes a function configured to generate, as the second effect, an effect that a second value is added into a first value associated with the operation target.
(5)
The program according to any one of (1) to (4),
wherein the functions further include:
a function configured to determine a position of the peripheral area of the operation target on a basis of a position of the operation target.
(6)
The program according to any one of (1) to (5),
wherein the functions further include:
a function configured to determine, in a case where a size of the operation target is changed, a size of the peripheral area of the operation target on a basis of the size of the operation target after change.
(7)
The program according to any one of (1) to (6),
wherein the functions further include:
a function configured to determine a size of the peripheral area of the operation target on a basis of a status of the operation target.
(8)
The program according to any one of (1) to (7),
wherein the generating function includes a function configured to generate the second effect whose effect is higher than that of the first effect.
(9)
The program according to any one of (1) to (8),
wherein the generating function includes a function configured to generate, as the second effect, an effect that appearance of a character is changed.
(10)
A program for causing a server to realize at least one function of the functions that the program described in any one of (1) to (9) causes the user terminal to realize, the server being capable of communicating with the user terminal.
(11)
A user terminal into which the program described in any one of (1) to (10) is installed.
(12)
A system for controlling progress of a video game, the system comprising a communication network, a server, and a user terminal, the system comprising:
a determining unit configured to determine whether a predetermined object is located in a peripheral area in accordance with progress of the video game or not, the peripheral area being set as an operation target of a user; and
a generating unit configured to generate an effect (hereinafter, referred to as a "second effect") in a case where it is determined that the object is located in the peripheral area, the second effect being different from an effect that is generated in a case where the object touches the operation target (hereinafter, referred to as a "first effect").
(13)
The system according to (12),
wherein the server includes the determining unit and the generating unit, and
wherein the user terminal includes:
a displaying unit configured to output a game image to a display screen of a display device on a basis of image information, the game image indicating progress of the video game transmitted from the server, the image information being used for displaying the game image.
(14)
A program for causing a server to realize functions to control progress of a video game,
wherein the functions include:
a determining function configured to determine whether a predetermined object is located in a peripheral area in accordance with progress of the video game or not, the peripheral area being set as an operation target of a user; and
a generating function configured to generate an effect (hereinafter, referred to as a "second effect") in a case where it is determined that the object is located in the peripheral area, the second effect being different from an effect that is generated in a case where the object touches the operation target (hereinafter, referred to as a "first effect"), and
wherein the program causes a user terminal to realize an outputting function configured to output a game image to a display screen of a display device on a basis of information, the game image indicating progress of the video game transmitted from the server, the information being used for displaying the game image.
(15)
A program for causing a server to realize functions to control progress of a video game,
wherein the functions include:
a determining function configured to determine whether a predetermined object is located in a peripheral area in accordance with progress of the video game or not, the peripheral area being set as an operation target of a user; and
a generating function configured to generate an effect (hereinafter, referred to as a "second effect") in a case where it is determined that the object is located in the peripheral area, the second effect being different from an effect that is generated in a case where the object touches the operation target (hereinafter, referred to as a "first effect").
(16)
A method of controlling progress of a video game, the method comprising:
a determining process of determining whether a predetermined object is located in a peripheral area in accordance with progress of the video game or not, the peripheral area being set as an operation target of a user; and
a generating process of generating an effect (hereinafter, referred to as a "second effect") in a case where it is determined that the object is located in the peripheral area, the second effect being different from an effect that is generated in a case where the object touches the operation target (hereinafter, referred to as a "first effect").
(17)
A method of controlling progress of a video game by a system, the system comprising a communication network, a server, and a user terminal, the method comprising:
a determining process of determining whether a predetermined object is located in a peripheral area in accordance with progress of the video game or not, the peripheral area being set as an operation target of a user; and a generating process of generating an effect (hereinafter, referred to as a "second effect") in a case where it is determined that the object is located in the peripheral area, the second effect being different from an effect that is generated in a case where the object touches the operation target (hereinafter, referred to as a "first effect").

INDUSTRIAL APPLICABILITY

According to one of the embodiments of the present invention, it is useful for a video game using an object.

EXPLANATION OF REFERENCE NUMERALS 10 server
11 determining unit
12 generating unit
13 changing unit
14 variable value managing unit
20, 201 to 20N user terminal
30 communication network
100 system

The invention claimed is:

1. A non-transitory computer-readable medium including a program for causing a user terminal to perform operations to control progress of a video game, the operations comprising:
  determining whether a predetermined object is located in a peripheral area in accordance with the progress of the video game or not, the peripheral area being set around an operation target of a user; and
  in response to the predetermined object being located in the peripheral area, generating a first effect in a first case where the predetermined object touches the operation target, and generating a second effect different from the first effect in a second case where the predetermined object passes through the peripheral area without touching the operation target.

2. The non-transitory computer-readable medium including the program according to claim 1, the operations further comprising:
  changing a form of the peripheral area of the operation target in a third case where a predetermined condition regarding the operation target is satisfied.

3. The non-transitory computer-readable medium including the program according to claim 2,
  wherein, in the changing of the form of the peripheral area, a shape or a size of the peripheral area is changed.

4. The non-transitory computer-readable medium including the program according to claim 2,
  wherein the predetermined condition includes at least one of the operation target carrying out a predetermined action, the operation target being equipped with predetermined equipment, or the operation target using a predetermined skill.

5. The non-transitory computer-readable medium including the program according to claim 1,
  wherein, in the generating of the second effect, a second parameter is varied, the second parameter being different from a first parameter that is varied in accordance with generation of the first effect.

6. The non-transitory computer-readable medium including the program according to claim 1,
  wherein, in the generating of the second effect, a second value is added into a first value associated with the operation target.

7. The non-transitory computer-readable medium including the program according to claim 1,
  wherein the operation target is a player character.

8. The non-transitory computer-readable medium including the program according to claim 7,
  wherein the second effect is configured to reduce an ability of the player character, and the first effect is configured to reduce a physical strength of the player character.

9. The non-transitory computer-readable medium including the program according to claim 1,
  wherein the peripheral area is a transparent area configured to be not visually recognizable to the user.

10. The non-transitory computer-readable medium including the program according to claim 1, the operations further comprising:
  determining, when the predetermined object is determined to be located in the peripheral area, a trajectory and a speed of the predetermined object; and
  determining whether the predetermined object passes through the peripheral area without touching the operation target or whether the predetermined object touches the operation target based on the trajectory and the speed of the predetermined object.

11. The non-transitory computer-readable medium including the program according to claim 1, the operations further comprising:
  first determining, in response to the predetermined object being located in the peripheral area, whether the predetermined object touches the operation target; and
  second determining, in response to the predetermined object being located in the peripheral area, whether the predetermined object passes through the peripheral area without touching the operation target,
  wherein the first determining and the second determining have a coexistence relationship.

12. The non-transitory computer-readable medium including the program according to claim 1, the operations further comprising:
  first determining, in response to the predetermined object being located in the peripheral area, whether the predetermined object touches the operation target; and
  second determining, in response to the predetermined object being located in the peripheral area, whether the predetermined object passes through the peripheral area without touching the operation target,
  wherein the first determining and the second determining have an exclusive relationship.

13. A system for controlling progress of a video game, the system including a communication network, a server, and a user terminal, the system comprising:
  a processor; and
  a memory including a program that, when executed by the processor, causes the processor to perform operations including:
    determining whether a predetermined object is located in a peripheral area in accordance with the progress of the video game or not, the peripheral area being set around an operation target of a user; and
    in response to the predetermined object being located in the peripheral area, generating a first effect in a first case where the predetermined object touches the operation target, and generating a second effect different from the first effect in a second case where the predetermined object passes through the peripheral area without touching the operation target.

14. A non-transitory computer-readable medium including a program for causing a server to perform operations to control progress of a video game, the operations comprising:
 determining whether a predetermined object is located in a peripheral area in accordance with the progress of the video game or not, the peripheral area being set around an operation target of a user; and
 in response to the predetermined object being located in the peripheral area, generating a first effect in a first case where the predetermined object touches the operation target, and generating a second effect (hereinafter, referred to as a "second effect") different from the first effect in a second case where the predetermined object passes through the peripheral area without touching the operation target.

* * * * *

UNITED STATES PATENT AND TRADEMARK OFFICE
CERTIFICATE OF CORRECTION

PATENT NO. : 11,148,052 B2  
APPLICATION NO. : 16/648036  
DATED : October 19, 2021  
INVENTOR(S) : Sakata Page 1 of 1

It is certified that error appears in the above-identified patent and that said Letters Patent is hereby corrected as shown below:

On the Title Page

Item (54) and in the Specification Column 1 (Line 2)/title, please change "A STACK" to
-- EFFECT --.
Item (57)/Abstract (Line 12), please change "changed" to -- changed. --.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*